C. Q. HAYES.
Tumbling-Rod Knuckle.

No. 215,922. Patented May 27, 1879.

Attest,
W. H. N. Knight
L. M. Seely

Inventor,
Calvin Q. Hayes
by Ellis Spear
Attorney.

UNITED STATES PATENT OFFICE.

CALVIN Q. HAYES, OF SPRING GREEN, WISCONSIN.

IMPROVEMENT IN TUMBLING-ROD KNUCKLES.

Specification forming part of Letters Patent No. 215,922, dated May 27, 1879; application filed August 5, 1878.

*To all whom it may concern:*

Be it known that I, CALVIN Q. HAYES, of Spring Green, in the county of Sauk and State of Wisconsin, have invented a new and useful Improvement in Tumbling-Rod Knuckles, of which the following is a specification.

My invention relates to means for lessening the friction of the bearing-surfaces of knuckle-joints; and consists in forming the bearing-surfaces of the hollowed part or section of the joint of friction-rollers, whereby the usual friction and abrasion of the parts are greatly diminished.

Figure 1:
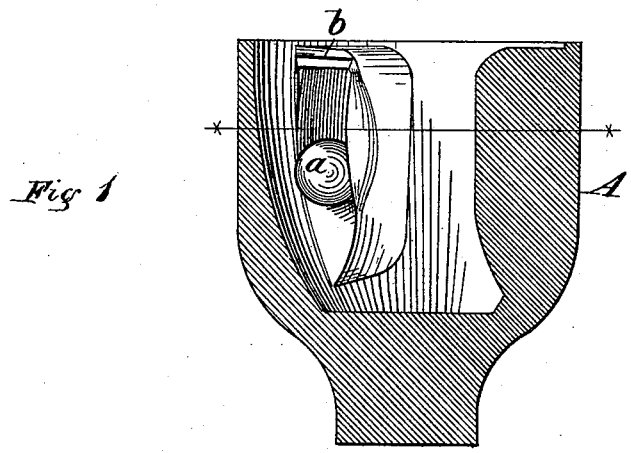
Figure 2:
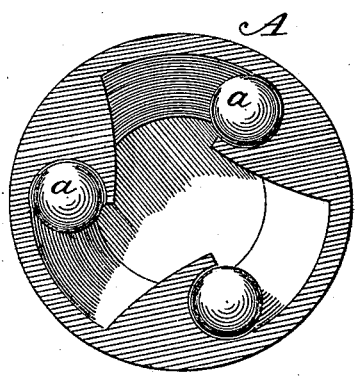
Figure 3:
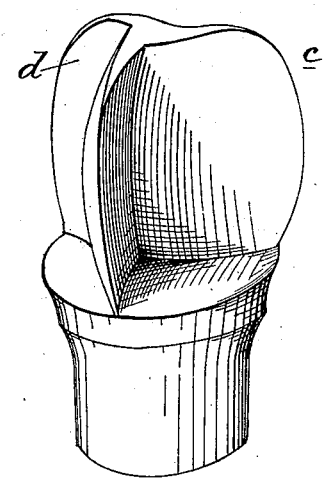

In the drawings hereto attached, and forming part of this specification, Figure 1 represents a longitudinal section of the socket of the joint, showing one of the pockets in section. Fig. 2 is a transverse section of the same, and Fig. 3 is a perspective of the solid part of the joint.

The socketed part of the joint (marked A) is formed with pockets, the open faces of which are arranged approximately in radial lines in relation to the socket. These pockets are cast with the walls closed at the outer end, and slightly curving inward to retain the balls $a$ in place. That part of the opening next to the mouth of the socket is made larger, and is sufficient to admit the ball.

A plug, $b$, fills the end of the space, and closes the widest part of the opening, so that the ball cannot escape after the plug is introduced. The balls are ordinarily one inch in diameter, but may be larger or smaller than this, if desired.

The ball should, of course, project from the pockets, to form proper bearing-surfaces for the flange of the solid part or ball of the joint. This ball or solid part is formed in the manner shown in Fig. 3. The flanges $c$ have plane bearing-surfaces $d$, and may be made convex on the opposite faces, if desired.

The knuckles are placed on the rod in the usual way, and, when power is applied, the balls operate between the surfaces $d$ of the flanges on the ball and the inner surfaces of the flanges of the socket.

When the rod is working at an angle the balls roll back and forth in the slots at each revolution, and give the knuckles a free and easy action.

What I claim is—

A knuckle-joint consisting of a flanged socket, provided with friction-balls, in combination with the flanges on the solid part of the joint, as described.

CALVIN Q. HAYES.

Witnesses:
   JOHN R. LEWIS,
   JAMES H. HAYES.